United States Patent
Wang et al.

(10) Patent No.: US 7,352,546 B2
(45) Date of Patent: Apr. 1, 2008

(54) MOTOR OVERCURRENT PROTECTION DEVICE

(75) Inventors: Frank Wang, Taichung (TW); Pao-Hsiang Chen, Taichung (TW)

(73) Assignees: Tranmax Machinery Co., Ltd., Taichung Hsien (TW); Emir System Co., Ltd., Taichung Hsien (TW)

( * ) Notice: Subject to any disclaimer, the term of this patent is extended or adjusted under 35 U.S.C. 154(b) by 48 days.

(21) Appl. No.: 11/486,229

(22) Filed: Jul. 14, 2006

(65) Prior Publication Data
US 2007/0153435 A1    Jul. 5, 2007

(30) Foreign Application Priority Data
Dec. 30, 2005   (TW) .............................. 94147537 A

(51) Int. Cl.
H02H 7/08       (2006.01)
(52) U.S. Cl. ................... 361/31; 361/1; 361/23; 361/87; 361/93.1; 318/254; 318/432
(58) Field of Classification Search ............... 361/31, 361/1, 23, 87, 93.1; 318/254, 432
See application file for complete search history.

(56) References Cited

U.S. PATENT DOCUMENTS

| | | | | |
|---|---|---|---|---|
| 4,988,939 A | * | 1/1991 | Reichard et al. ............ | 318/800 |
| 5,166,585 A | * | 11/1992 | Koharagi et al. ............ | 318/254 |
| 5,294,872 A | * | 3/1994 | Koharagi et al. ............ | 318/254 |
| 5,410,548 A | * | 4/1995 | Millman .................... | 714/741 |

* cited by examiner

Primary Examiner—Rita Leykin
(74) Attorney, Agent, or Firm—Troxell Law Office, PLLC

(57) ABSTRACT

A motor overcurrent protection device connectable to a motor. The motor has a rotary shaft and a controlling port. The motor overcurrent protection device includes a sensing unit, a driving unit and a controlling unit. The sensing unit includes a magnetic block arranged on a circumference of the rotary shaft and a Hall device positioned beside the rotary shaft. The magnetic block is rotatable along with the rotary shaft to be instantaneously aligned with the Hall device. The driving unit is electrically connected with the controlling port of the motor. The controlling unit is electrically connected with the sensing unit and the driving unit. When the motor operates, each time the magnetic block is aligned with the Hall device, the Hall device outputs a pulse signal which is stored in the controller of the controlling unit. All the pulse signals are summed up in a preset sensing time of the controller. In the case that the sum does not exceed a standard rotational speed value, the controlling unit via the driving unit will stop the motor from operating so as to protect the motor from malfunctioning due to rising of current.

4 Claims, 4 Drawing Sheets

MOTOR OVERCURRENT PROTECTION DEVICE

BACKGROUND OF THE INVENTION

The present invention is related to a motor circuit device, and more particularly to a motor overcurrent protection device.

FIGS. 1 and 2 show a conventional motor overcurrent protection device connected to a motor 100. The motor 100 has a controlling lead 101. The motor overcurrent protection unit includes a current sensor 11, a current regulator 12 and a controlling unit 13.

The current sensor 11 is looped with the controlling lead 101 for sensing the working current $I_F$ of the motor 100. As shown in FIG. 2, the current sensor 11 is a Hall effect current sensor made by an American manufacturer TAMURA Company under Model No. L08P050D15.

The current regulator 12 is serially connected with the current sensor 11 via the controlling lead 101 for regulating the working current $I_F$. In general, the current regulator 12 is a circuit made by an American manufacturer International Rectifier Company under Model No. IRF640.

The controlling unit 13 is electrically connected with the current sensor 11 and the current regulator 12. When the motor 100 is activated, the controlling unit 13 controls the operation of the current regulator 12 to output a certain working current $I_F$ to the motor 100 for controlling the rotational speed thereof. In the case of abnormal operation of the motor 100, generally, that is, abnormal decrement of the rotational speed of the motor 100, the current $I_F$ will be inevitably enlarged to increase the kinetic energy. Consequently, in condition of high current, the motor 100 tends to overheat and damage. In order to protect the motor 100, the current of the controlling lead 101 will be first sensed by the current sensor 11 and then the rising analog signal of the current will be fed back to the controlling unit 13. The controlling unit 13 serves to lower the current and achieve the object of protection of the motor 100.

Accordingly, the motor overcurrent protection device is able to prevent excessively high current from being input to the motor 100 so as to protect the motor 100 from being overheated and damaged. Even the controlling lead 101 can be protected from being overheated so as to avoid accident.

However, in actual use, the conventional motor overcurrent protection device still has some shortcomings as follows:

1. The current will generate a magnetic field which will induce a voltage to the Hall effect current sensor. Through the induced voltage, the controlling unit 13 can tell the change of the working current $I_F$ of the motor 100. This procedure necessitates electromagnetic induction and magnetoelectric induction. In addition, the induced voltage is an analog signal which needs to be converted into digital signal. Therefore, after several times converted, the sensing will be delayed and the precision of sensing will be discounted. Consequently, the controlling unit 13 can hardly real-time control the change of the working current $I_F$.

2. The current sensor 11 is one of the most important elements of the conventional motor overcurrent protection device. The current sensor 11 leads to increment of the cost for the motor overcurrent protection device. Moreover, a design must be considered for converting the analog signal into the digital signal. This not only increases the cost, but also complicates the circuit and enlarges the volume of the device. Therefore, such arrangement fails to meet the trend to minimize the volume of the device.

3. With respect to the conventional device, in the case of abnormal low rotational speed or even stop of the motor 100, the rise of the working current $I_F$ can be sensed to give a warning. However, the conventional device cannot tell whether the motor 100 malfunctions immediately after activated or after having operated for a certain period. These two different situations give different information for removing failures when repairing the motor. The conventional device is unable to distinguish these two situations from each other so that a repairman can hardly quickly remove the failures.

There is another existent current sensor (not shown), which is directly "serially connected with" the controlling lead 101 as a current meter. Such current sensor is serially connected with the lead 101. Equivalently, a load is added to the motor to affect the value working current $I_F$. Besides, the output analog signal still needs to be converted into the digital signal. Therefore, the cost is still relatively high and the efficiency and precision still cannot be promoted.

SUMMARY OF THE INVENTION

It is therefore a primary object of the present invention to provide a motor overcurrent protection device. The motor overcurrent protection device can precisely judge abnormal operation of a motor and real-time react to protect the motor. In addition, the motor overcurrent protection device of the present invention can accurately control the rotational speed of the motor and distinguish whether the motor cannot operate in the instant of activating the motor or the motor operates at too low speed after activated. Therefore, the rotational speed can be real-time adjusted to protect the motor. Also, this helps in judging the cause of the failure for quickly removing the failure.

According to the above object, the motor overcurrent protection device of the present invention is connectable to a motor. The motor has a rotary shaft and a controlling port for controlling the motor. The motor overcurrent protection device includes a sensing unit, a driving unit and a controlling unit.

The sensing unit includes a magnetic block arranged on a circumference of the rotary shaft and a Hall device positioned beside the rotary shaft. The magnetic block is rotatable along with the rotary shaft to be instantaneously aligned with the Hall device. The driving unit is electrically connected with the controlling port of the motor. The controlling unit is electrically connected with the sensing unit and the driving unit. When the motor operates, each time the magnetic block is aligned with the Hall device, the Hall device outputs a pulse signal which is stored in the controller of the controlling unit. All the pulse signals are summed up in a preset sensing time of the controller. In the case that the sum exceeds a preset standard rotational speed value, the controlling unit via the driving unit keeps the motor operating. In the case that the sum does not exceed the standard rotational speed value, the operation of the motor is interrupted.

In the motor overcurrent protection device of the present invention, the sensing unit is omissible. A magnetic block and a Hall device inside a brushless motor can be directly used instead of the sensing unit. This can achieve the same sensing effect.

The present invention can be best understood through the following description and accompanying drawings wherein:

DETAILED DESCRIPTION OF THE PREFERRED EMBODIMENTS

Figure 1:
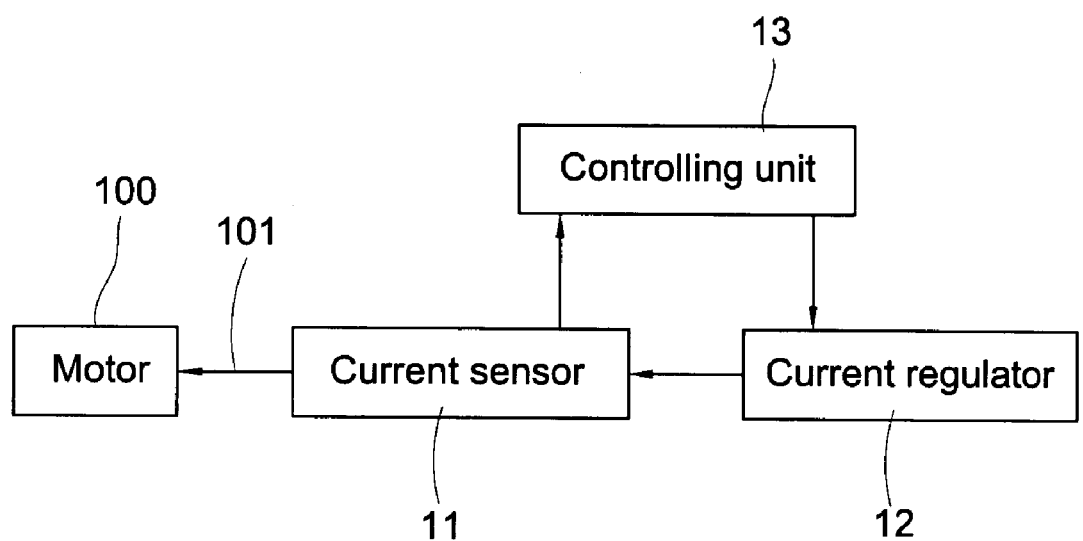
FIG. 1 is a block diagram of a conventional motor overcurrent protection device.
Figure 2:
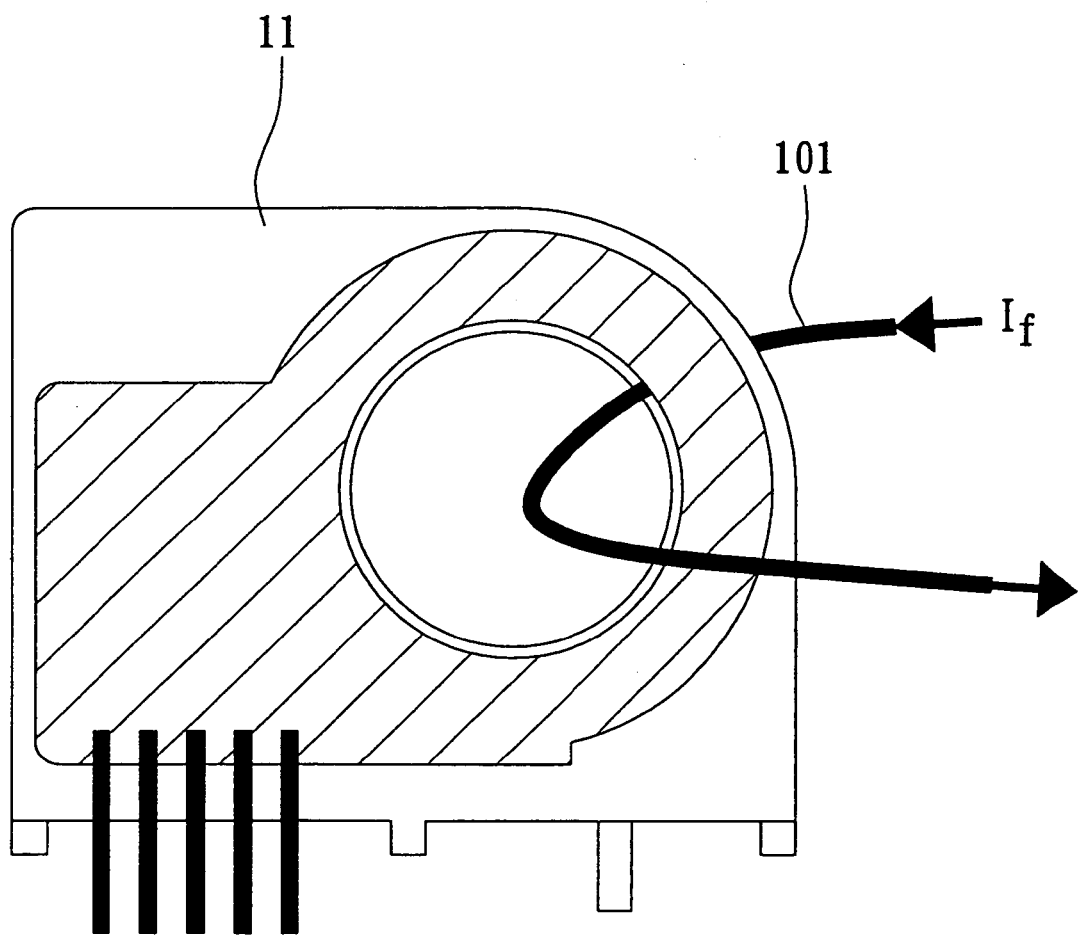
FIG. 2 is partially sectional view of the conventional motor overcurrent protection device, showing the current sensor thereof.
Figure 3:
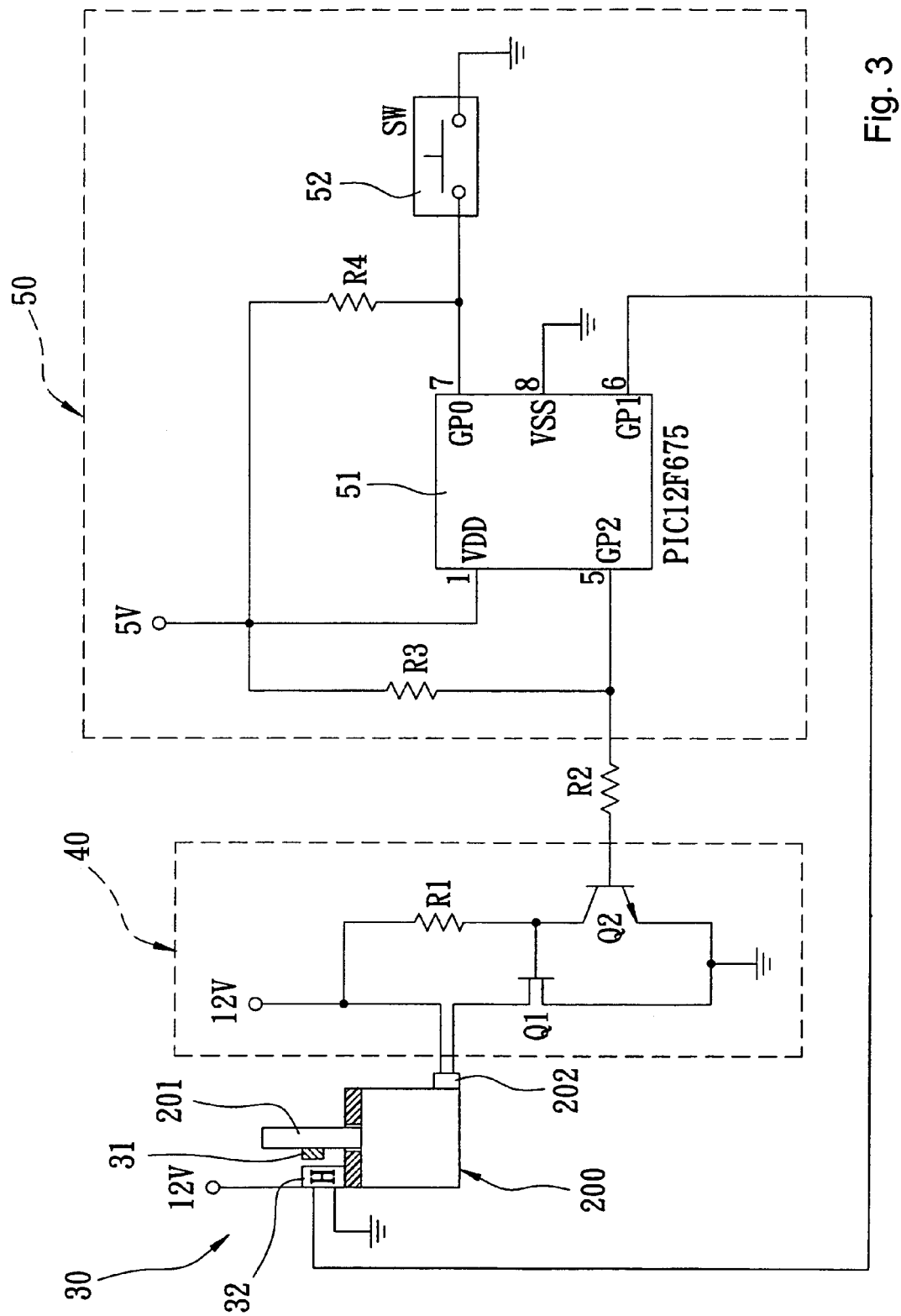
FIG. 3 is a circuit diagram of the motor overcurrent protection device of the present invention.

Please refer to FIG. 3. The motor overcurrent protection device of the present invention is connectable to a motor 200. The motor 200 has a rotary shaft 201 and a controlling port 202 for controlling the motor 200. The motor overcurrent protection device includes a sensing unit 30, a driving unit 40 and a controlling unit 50.

The sensing unit 30 includes a magnetic block 31 and a Hall device 32. The magnetic block 31 is arranged on a circumference of the rotary shaft 201. The Hall device 32 is positioned beside the rotary shaft 201. The magnetic block 31 is rotatable along with the rotary shaft 201 to be instantaneously aligned with the Hall device 32.

The driving unit 40 is electrically connected with the controlling port 202 of the motor 200. In this embodiment, the driving unit 40 adjusts the rotational speed of the motor 200 by way of regulating the current. The driving unit 40 is a circuit composed of transistor $Q_1$ made by the American manufacturer International Rectifier Company under Model No. IRF640.

The controlling unit 50 is electrically connected with the sensing unit 30 and the driving unit 40. The controlling unit 50 includes a controller 51 and an activating switch 52 electrically connected with the controller 51. The controller 51 is a microcontroller made by an American manufacturer Microchip Company under Model No. PIC12F675. The controller 51 has small volume and is easily usable at low power consumption. Also, the controller 51 is programmable. In this embodiment, the controlling unit 50 is inbuilt with a sensing time (set 100 ms) for judgment and a standard rotational speed value (set 3000 rpm) also for judgment.

Accordingly, each time the rotary shaft 201 is rotated, the magnetic block 31 is driven to revolve by one circle. Therefore, when the motor 200 operates, each time the rotary shaft 201 is rotated, the magnetic block 31 is aligned with the Hall device 32 one time, whereby a precise pulse signal can be achieved from the Hall device 32 as an output. The output can be stored in the controller 51. Under such circumstance, all the pulse signals can be summed up in the preset sensing time of the controller 51. When the sensing time expires, in the case that the sum exceeds the standard rotational speed value, that is, 3000 rpm, the controlling unit 50 via the driving unit 40 will keep the motor 200 operating. In the case that the sum does not exceed the standard rotational speed value, the operation of the motor 200 will be interrupted.

In addition, in actual use, generally the controlling unit 50 is used in cooperation with a switch, that is, the activating switch 52, for activating and stopping the motor 200. The interaction between the activating switch 52, the controller 51, the motor 200 and the sensing unit 30 will be further described hereinafter.

The following Table 1 shows the states of the motor 200 and the potential relationship between GP0 port, GP1 port and GP2 port of the controller 51:

TABLE 1

| Using state | 1. not activated | 2. activated | 3. activated | 4. activated |
|---|---|---|---|---|
| Motor state | stop | stop | stop | Operation |
| GP0 | High potential | Low potential | Low potential | Low potential |
| GP1 | No matter whether there is pulse signal or not | No Pulse signal | Pulse signal not exceed stander value | Pulse signal exceed stander value |
| GP2 | High potential | Low to high potential | Low to high potential | Low potential |
| Result | Protection | Protection | Protection | Normal operation |

When the motor 200 is not activated by a user, the activating switch 52 is switched off (as shown in FIG. 3) and the GP0 port of the controller 51 is in high potential. At this time, no matter whether the GP1 port receives the pulse signal (which can be caused by swinging of the motor), the GP2 port will keep in high potential to energize the transistor $Q_2$ of FIG. 3 and turn off the motor 200.

When the user desires to turn on the motor 200, the user first switches on the activating switch 52. Then the GP2 port of the controller 51 will be in the low potential to make the motor 200 operate. However, in the case that the GP1 port fails to receive any pulse signal in the sensing time (100 ms), this means the motor 200 cannot start in the beginning. In order to avoid continuous increment of the current, the GP2 port will be transformed to high potential and the motor 200 is in a stopped state. The user can be aware that this can be caused by the failure of the motor 200, the driving unit 40 or the controller 51. Accordingly, a serviceman can manage the range of the failure and quickly remove the failure.

In addition, after the activating switch 52 is switched on, in the case that the GP1 port receives the pulse signal, it is necessary to further judge whether the sum exceeds the standard rotational speed value (3000 rpm) in the sensing time (100 ms). If not, then the GP2 port will be still transformed from the lower potential into high potential so as to avoid continuous rising of the current caused by too slow rotational speed of the motor 200. Therefore, the motor 200 must stop to get protected. Under such circumstance, the too slow rotational speed may be caused by the motor 200 itself. Therefore, a serviceman can precisely control the failure range to repair or replace the motor 200 for removing the failure.

In addition to the above protection states, the optimal state certainly is that after the activating switch 52 is switched on, the GP1 port also receives the pulse signal exceeding the standard rotational speed value. This ensures that the motor 200 functions normally. Accordingly, the GP2 port will keep in the low potential state to keep the motor 200 operating. However, the controller 51 will still monitor the pulse signal received by the GP1 port. In the case that the pulse signal fails to meet the standard rotational speed value, the motor 200 will be still stopped from operating. Therefore, the system is continuously monitored and kept normally operating.

When the motor overcurrent protection device is activated and the motor 200 is stopped from operating, in the case that the motor 200 is to be reactivated, it is only necessary to re-switch on the activating switch 52 to achieve a resetting effect for reactivating the motor 200. Also, the controller 51 is programmable so that the sensing time and the standard rotational speed value are variable. This is different from the conventional serial-type sensing manner which necessitates modification of circuit structure for changing the preset sensing function. By means of changing the program of the controller 51, the present invention is applicable to various motors to provide overcurrent protection effect for all these motors.

Figure 4:
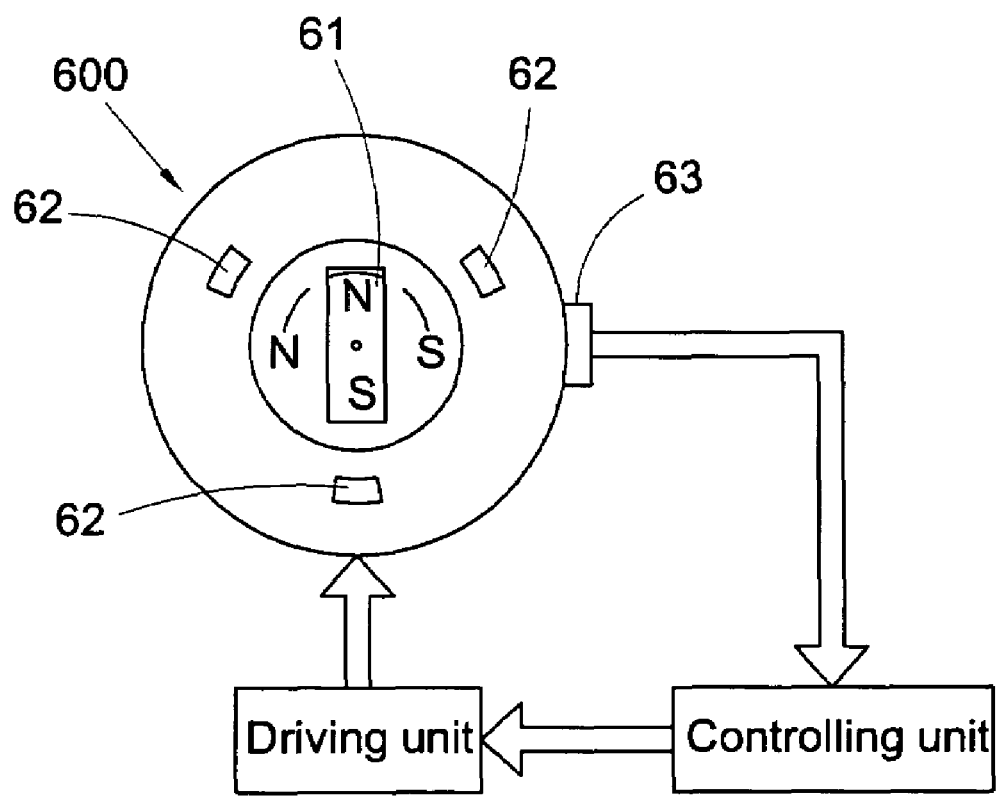
FIG. 4 is a block diagram of the motor overcurrent protection device of the present invention, in which the sensing unit is inbuilt in a brushless motor.

Referring to FIG. 4, it should be noted that in the motor overcurrent protection device of the present invention, the sensing unit 30 is omissible. A magnetic block 61 and a Hall device 62 inside a brushless motor 600 can be directly used instead of the sensing unit 30. The brushless motor 600 further includes a controlling port 63 electrically connected with the Hall device 62. The driving unit and controlling unit of the motor overcurrent protection device are identical to those of the above embodiment to achieve the same sensing effect. This simplifies the structure and lowers the manufacturing cost.

Also, in the structure of FIG. 3, the magnetic block 31 and the Hall device 32 are cheaper than the conventional Hall effect current sensor made by the American manufacturer TAMURA Company. Moreover, by means of the present invention, the precision of the motor overcurrent protection device can be enhanced.

In conclusion, the present invention can accurately control the rotational speed of the motor 200 and distinguish whether the motor 200 cannot operate in the instant of activating the motor 200 or the motor 200 operates at too low speed after activated. Therefore, the rotational speed can be real-time adjusted to protect the motor 200. Also, this helps in judging the cause of the failure for quickly removing the failure.

The above embodiments are only used to illustrate the present invention, not intended to limit the scope thereof. Many modifications of the above embodiments can be made without departing from the spirit of the present invention.

What is claimed is:

1. A motor overcurrent protection device connectable to a motor, the motor having a rotary shaft and a controlling port for controlling the motor, the motor overcurrent protection device comprising:
    a sensing unit including a magnetic block and a Hall device, the magnetic block being arranged on a circumference of the rotary shaft, the Hall device being positioned beside the rotary shaft, the magnetic block being rotatable along with the rotary shaft to be instantaneously aligned with the Hall device;
    a driving unit electrically connected with the controlling port of the motor; and
    a controlling unit electrically connected with the sensing unit and the driving unit, the controlling unit including a controller, whereby when the motor operates, each time the magnetic block is aligned with the Hall device, the Hall device outputs a pulse signal which is stored in the controller, all the pulse signals being summed up in a preset sensing time of the controller, in the case that the sum exceeds a preset standard rotational speed value, the controlling unit via the driving unit keeping the motor operating, in the case that the sum does not exceed the standard rotational speed value, the operation of the motor being interrupted.

2. The motor overcurrent protection device as claimed in claim 1, wherein the controlling unit further includes an activating switch electrically connected with the controller, whereby when the activating switch is switched off, the controller will interrupt the operation of the motor, while when the activating switch is switched on, the controller will activate the motor, when the sensing time expires, if the sum of the pulse signals exceeds the standard rotational speed value, the motor being kept operating, if the sum of the pulse signals does not exceed the standard rotational speed value, no matter whether the activating switch is switched on or off, the operation of the motor will be interrupted.

3. A motor overcurrent protection device connectable to a brushless motor, the brushless motor having a rotary shaft, multiple magnetic blocks arranged on a circumference of the rotary shaft, multiple Hall devices arranged beside the magnetic blocks and a controlling port electrically connected with the Hall devices, the motor overcurrent protection device comprising:
    a driving unit electrically connected with the controlling port of the motor; and
    a controlling unit electrically connected with one of the Hall devices and the driving unit, the controlling unit including a controller, whereby when the motor operates, each time the magnetic blocks are aligned with the Hall devices, the Hall devices output a pulse signal which is stored in the controller, all the pulse signals being summed up in a preset sensing time of the controller, in the case that the sum exceeds a preset standard rotational speed value, the controlling unit via the driving unit keeping the motor operating, in the case that the sum does not exceed the standard rotational speed value, the operation of the motor being interrupted.

4. The motor overcurrent protection device as claimed in claim 3, wherein the controlling unit further includes an activating switch electrically connected with the controller, whereby when the activating switch is switched off, the controller will interrupt the operation of the motor, while when the activating switch is switched on, the controller will activate the motor, when the sensing time expires, if the sum of the pulse signals exceeds the standard rotational speed value, the motor being kept operating, if the sum of the pulse signals does not exceed the standard rotational speed value, no matter whether the activating switch is switched on or off, the operation of the motor will be interrupted.

* * * * *